Nov. 27, 1951   R. V. ALLEN   2,576,168
MAGNET CUTOFF VALVE
Filed April 25, 1950

Rufus V. Allen
INVENTOR.

BY *[signatures]*
Attorneys

Patented Nov. 27, 1951

2,576,168

UNITED STATES PATENT OFFICE 2,576,168

MAGNET CUTOFF VALVE

Rufus V. Allen, Chino, Calif.

Application April 25, 1950, Serial No. 158,004

4 Claims. (Cl. 137—139)

This invention relates to new and useful improvements in valves and the primary object of the present invention is to provide a cut-off valve for the fuel line of a vehicle that is actuated to its open position as a key operated lock or push lock mounted on the vehicle is actuated on upon the insertion of the proper key into the lock.

Another very important object of the present invention is to provide a cut-off valve for the fuel line or conduit of a vehicle involving a sliding magnet and a ball valve that is attracted to the magnet to permit fuel to flow through the conduit when the magnet is moved over the ball valve.

A further important object of the present invention is to provide a magnet cut-off valve of the aforementioned character wherein the magnet is connected to the sliding key operated inner barrel of a lock mechanism mounted on a concealed portion of a vehicle so that as the inner barrel is moved upon the insertion of a proper key therein, the magnet will be moved over the ball valve to urge the ball valve to its open position.

A still further aim of the present invention is to provide a cut-off valve that is extremely small and compact in construction, strong and reliable in use, simple and practical in structure, inexpensive to manufacture, one that is quickly and readily applied to or removed from the fuel line of a vehicle, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
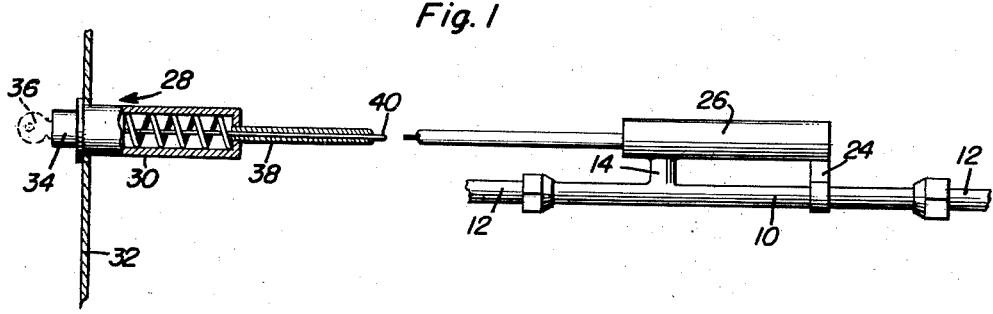
Figure 1 is a fragmentary side elevational view of the present invention and showing the same applied to the fuel line and a locking mechanism of a vehicle.

Referring now to the drawings in detail, wherein for the purpose of illustration, there is disclosed a preferred embodiment of the present invention, the numeral 10 represents a tubular member or conduit that is interposed in and which forms a part of a fuel line or supply conduit 12 of a vehicle fuel system. The conduit 10 is provided with an upstanding, hollow, lateral projection 14 whose inner open end communicates with the interior of the conduit 10.

Figure 3:
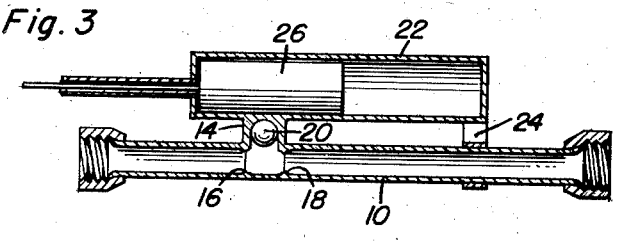
Figure 3 is a view similar to Figure 2 but showing the magnet moved to attract the ball valve thereto; and, Figure 4 is an enlarged transverse vertical sectional view taken substantially on the plane of section line 4—4 Figure 2.
Figure 4:
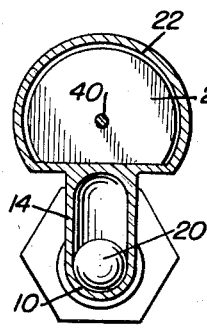

The inner wall of the conduit 10 is provided with longitudinally spaced ribs or rings 16 and 18 forming valve seats against which a ball valve 20, of magnetically attracted material, is selectively engaged. The seats or rings 16 and 18 are so located as to permit the ball valve 20 to rise in the hollow projection 14 as shown in Figure 3.

Rigidly attached to or forming an integral part of the projection 14, is an elongated casing 22 that parallels the conduit 10. The projection 14 is attached to the casing 22 adjacent one end of the casing and the other end of the casing is braced to the conduit 10 by a suitable bracket 24.

A magnet 26 is slidably received in the casing 22 and is movable away from or over the projection 14, when the magnet 26 is moved over the projection 14, the valve 20 will be urged toward the magnet and hence the valve will rise in the projection 14, it being understood that the magnet is of sufficient strength to attract the ball valve even though the upper end of the projection 14 is closed to prevent the entrance of fuel into the casing 22.

The valve structure aforementioned is associated with the locking mechanism 28. This locking mechanism is well known and consists of an outer barrel 30 that is mounted on a suitable, preferably concealed portion of the vehicle 32 and a spring urged inner barrel 34 that is urged from one end of the outer barrel upon the insertion and turning of a proper key 36 in the inner barrel 34.

Figure 2:
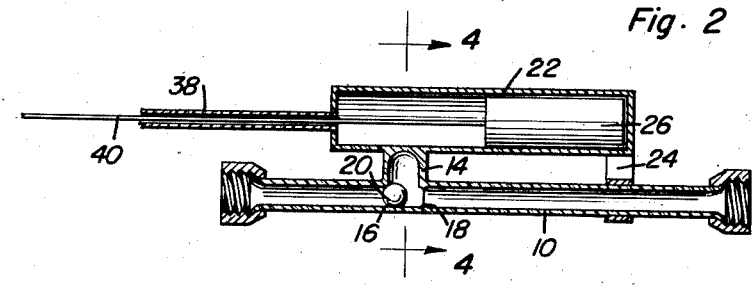
Figure 2 is an enlarged longitudinal vertical sectional view of the present invention.

The casing 26 is substantially co-axial with the barrels 30 and 34, as shown in Figure 1, and the barrel 30 is connected to the casing 26 by a guide tube 38 that slidably receives a relatively rigid rod 40. The rod 40 is terminately attached to the magnet 26 and the inner barrel 34 so that as the inner barrel is moved into the outer barrel against action of the spring (not shown) acting on the inner barrel, the magnet 26 will be urged away from the projection 14 and the valve will drop into the conduit 10 to prevent fuel from flowing through the conduit 10 (see Figure 2), whereas a movement of the barrel 34 from the barrel 30 by the insertion of the key 36 into the barrel 34, will move the magnet 26 over the projection 14 and the valve 20 will rise in the projection 14 to permit fuel to flow through the conduit 10 (see Figure 3).

The lock mechanism is installed at any desired place on the vehicle so that it will be partially or entirely hidden from the glance of the casual observer, since the main purpose of the invention is to provide security against theft of the vehicle. Also, the lock mechanism may be replaced by a push and pull button that is attached to the rod 40.

Having described the invention, what is claimed as new is:

1. A cut-off valve comprising a conduit having a lateral projection, a casing paralleling said conduit and mounted on said projection, valve seats within said conduit, a valve member within the conduit and normally seated against one of said seats, said projection being hollow to receive said valve member, said valve member being of magnetically attracted material, and a magnet slidably received in said casing and movable to a position over said projection to attract the valve member and move the valve member into the projection and out of the conduit.

2. A valve structure comprising a conduit having a valve seat therein, a valve member located within the conduit and seated against the valve seat to prevent the flow of fluid through the conduit, said conduit also having a hollow lateral projection for receiving the valve member to permit fluid to flow through the conduit, said valve member being of magnetically attracted material, and a magnet slidable to a position overlying said projection to urge the valve into the projection and in its open position.

3. In combination with a key operated locking mechanism including an outer barrel and an inner barrel that is moved longitudinally from the outer barrel upon the insertion of a proper key in the inner barrel, a cut-off valve comprising a conduit having a valve seat therein, a valve member normally seated against said seat, said conduit having a hollow lateral projection for receiving said valve member, and means actuated by the inner barrel, during the movement of the inner barrel from the outer barrel, for urging the valve member into the projection, said means including a magnet and a pull line terminally attached to said magnet and said inner barrel, said valve member being of magnetically attracted material to be attracted to the magnet.

4. In a vehicle having a key operated locking mechanism including an inner barrel and an outer barrel wherein the inner barrel is spring urged from one end of the outer barrel upon insertion of a proper key in the inner barrel and a fuel conduit, a cut-off valve for the conduit comprising a casing mounted on the conduit, a magnet slidably received in the casing and connected to the inner barrel for movement with the inner barrel relative to the outer barrel, said conduit having a hollow lateral projection attached to said casing adjacent one end of the casing, a valve seat in the conduit, and a magnetically attracted ball valve within the conduit and normally seated against said seat, said valve being movable into the hollow projection upon sliding of the magnet over the projection in response to movement of the inner barrel from the outer barrel.

RUFUS V. ALLEN.

REFERENCES CITED

The following references are of record in the file of this patent:

UNITED STATES PATENTS

| Number | Name | Date |
|---|---|---|
| 1,513,481 | Brede | Oct. 28, 1924 |
| 2,307,723 | Anderson | Jan. 5, 1943 |

FOREIGN PATENTS

| Number | Country | Date |
|---|---|---|
| 59,802 | Sweden | Dec. 24, 1921 |